Patented July 3, 1928.

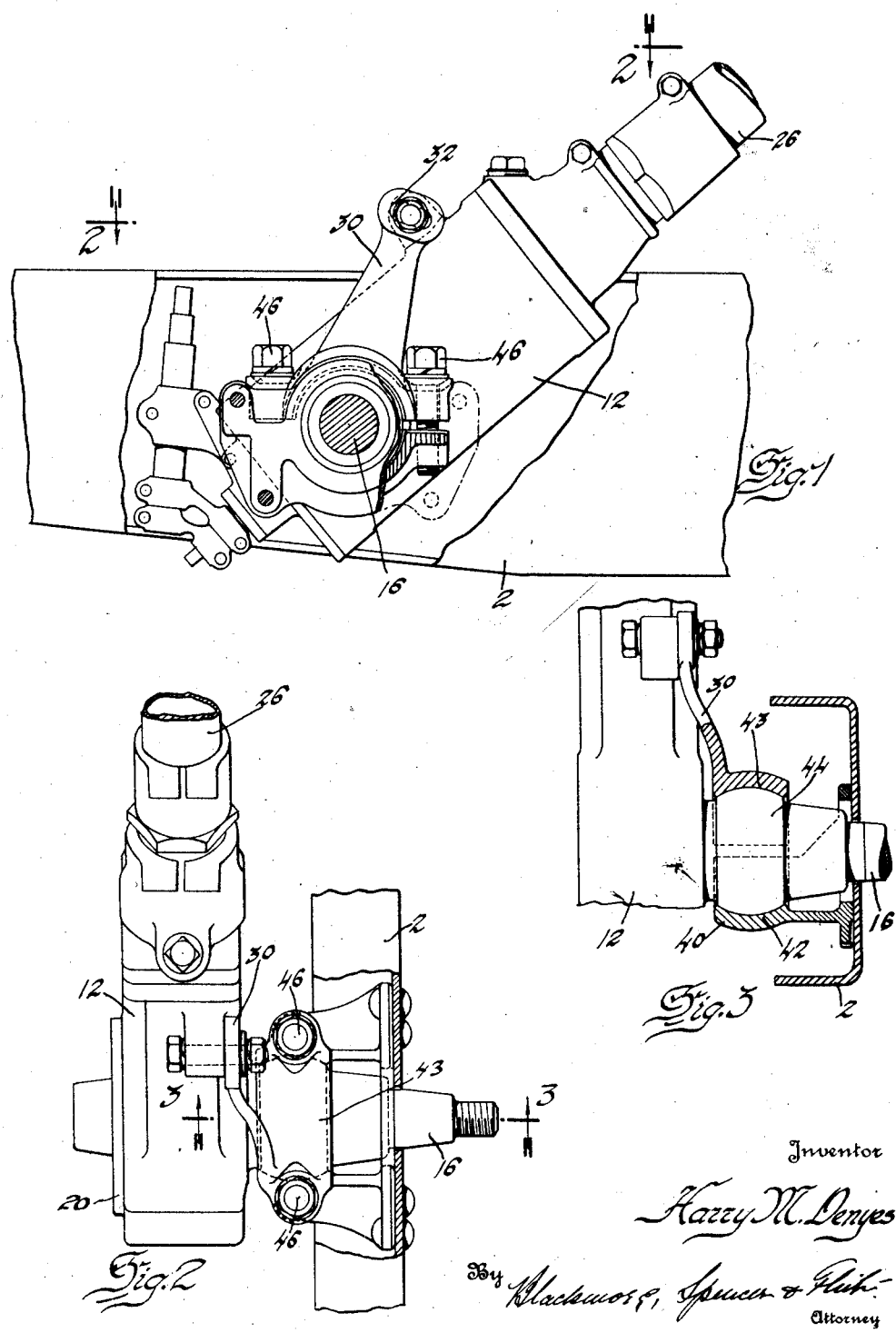

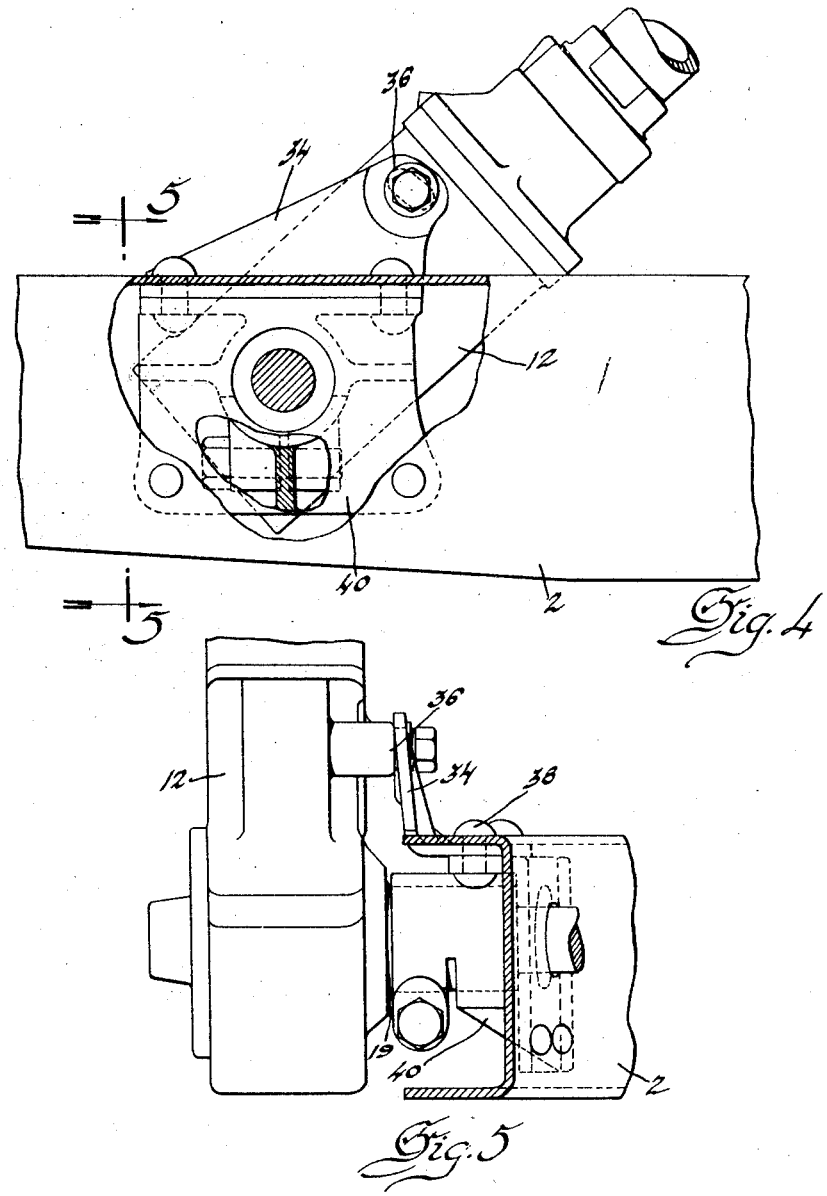

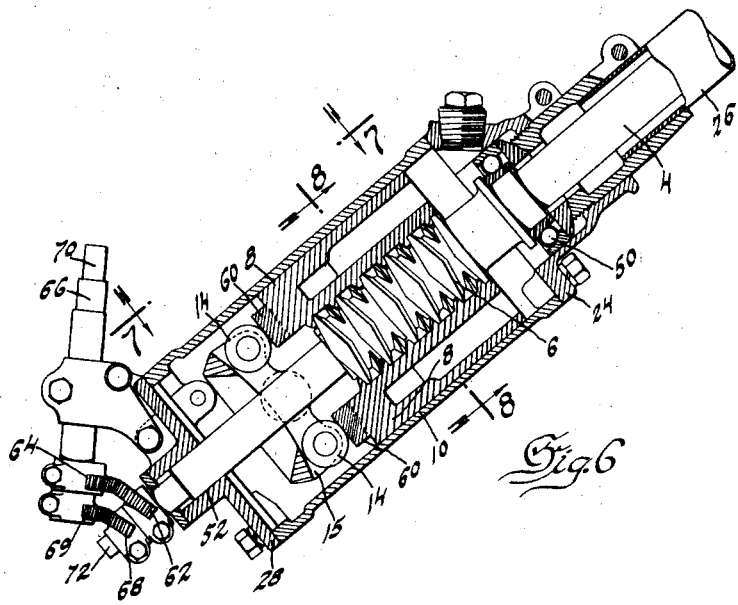

1,675,645

UNITED STATES PATENT OFFICE.

HARRY M. DENYES, OF SAGINAW, MICHIGAN, ASSIGNOR TO GENERAL MOTORS CORPORATION, OF DETROIT, MICHIGAN, A CORPORATION OF DELAWARE.

STEERING GEAR.

Application filed September 16, 1925. Serial No. 56,714.

This is a continuation in part of my prior application Serial No. 745,163, filed October 22, 1924.

Steering gears used upon automobiles are subject to stresses resulting chiefly from the resistance of the road wheels to turning and to blows received by the latter which tend to reverse the steering mechanism. In the modern type of irreversible steering gear in which worm gearing, or the equivalent, is used, these forces cannot in any great measure be transmitted to the steering shaft and consequently are taken by the steering gear housing. In the specific type of gear herein disclosed, which is known as the Jacox gear, these forces tend to rotate the steering column about the axis of the horizontal shaft through which steering movement is transmitted from the steering shaft to the road wheels. This rotation is resisted by the connections which secure the steering gear to the vehicle. One of these connections usually takes the form of a bracket secured to the frame and clamped to an extension of the steering gear housing in which the horizontal shaft previously referred to is journaled. The part of the housing where this clamping takes place is consequently subject to very great twisting strain accentuated by the small radius at which the resistance to rotation comes into play, necessitating that the housing be made of strong and expensive material such as malleable iron. The steering gear is also customarily clamped to the dash and this connection serves also to resist turning movement of the steering gear but any distortion at this point will affect the proper functioning of the gear itself and the transmission of strains to this connection should be avoided. I have found that by providing a separate torque member secured to the frame and to the steering gear housing adjacent the lower end of the column, the strain upon the housing itself is materially reduced because of the greater leverage at which the resisting force comes into play, this reduction in strain permitting the use of cheaper materials in the manufacture of the housing and at the same time providing a more rigid structure in which proper alinement of the parts is assured.

Another feature of my invention has to do with accuracy and ease of assembly. Owing to lack of exact uniformity in manufacture, the steering gear, when bolted to the frame, may be quite a bit out of line at the dash bracket, sometimes as much as an inch and a half. In such event it has heretofore been the practice for the workmen to force the steering column in position so that it could be clamped to the dash bracket, a practice which leaves the parts of the gear under considerable strain. To avoid this difficulty in assembling and to relieve the gear from such strains, I have provided the lower end of my steering column with a universal mounting which permits the column to be properly alined with the dash bracket before it is clamped to the frame. Although not essential, I have preferably combined the torque member previously described with this universal mounting.

As is well known, steering gears of the Jacox type, embody sliding members in the form of half nuts which mesh with threads provided on the lower end of the steering shaft. In their reciprocation they effect rocking of a yoke member which has connection with the stub axles to swing the front wheels. It has been the previous practice to provide the lower end of the steering column with bearings to take end thrust, but not with radial bearings, thus permitting the shaft to adjust itself on the threads of the half nuts without binding. I have found it to be undesirable in practice to permit the shaft to thus "float" and have accordingly devised a construction in which the lower end of the shaft is provided with radial as well as thrust bearings and, to permit the proper meshing of the threads on the shaft with the half nuts, have permitted the half nuts to have slight lateral movement in their guideways. To further facilitate proper seating of the half-nuts I have provided the ends of the yoke which contact with the half-nuts with rollers having spherical faces.

It has previously been common practice in steering gear of this type to provide the portions of the half nuts which contact with the yoke member with blocks of hardened material to resist wear, these blocks being customarily pressed on the half-nuts. In my improved construction I have dispensed with the blocks and have instead chilled the lower faces of the half-nuts.

Other objects and advantages of the invention will appear from the following description taken in connection with the accompanying drawing in which:

Figure 1 is a side elevation of my improved steering gear with portions of the frame member shown broken away;

Figure 2 is a view taken on line 2—2 of Figure 1;

Figure 3 is a view partly in section taken on line 3—3 of Figure 2;

Figure 4 is a view corresponding to Figure 1 and showing a modified form;

Figure 5 is a view taken on line 5—5 of Figure 4;

Figure 6 is a sectional view showing the steering gear mechanism;

Figure 7 is a sectional view looking in the direction indicated by line 7—7 of Figure 6;

Figure 8 is a section taken on line 8—8 of Figure 6; and

Figure 9 is a sectional view of a modified form.

I have indicated at 2 one of the usual channel irons constituting a portion of the automobile frame. The steering gear, as best shown in Figure 6, comprises a shaft 4 to the upper end of which is secured the usual steering wheel, not shown. The lower end of the shaft is provided with right and left hand threads as shown at 6 which mesh with corresponding threads formed upon the half nuts 8 which are guided for sliding movement in guideways 10 forming, in this instance, an integral part of the housing member 12. The lower ends of the half nuts engage rollers 14 mounted upon opposite ends of the yoke member 15 rigidly connected to the stub shafts 16 and 18, journaled, respectively, in an integral extension of the housing 12 and in a plate member 20 removably secured to the lower end of the housing. To the outer end of the stub shaft 16 is secured an arm 22 which is connected in the usual manner to parts which effect swinging of the steering wheels.

It is now apparent that, as shaft 4 is rotated, half nuts 8 will be reciprocated effecting a rocking of the yoke member 15 and a rotation of the steering wheels. The resistance of the road wheels to turning and the shocks received thereby which tend to rotate the shaft 16 and consequently the yoke member 15, will cause the yoke member to exert upward pressure against one of the half nuts 8 and, as the half nuts are prevented from moving in that direction by the pitch of the threads operatively connecting it to the steering shaft, the effect of the force is received by the housing 12 and tends to cause the rotation of the housing and the other parts of the gear about the axis of the stub shafts 16 and 18. In prior constructions, of which Figure 5 will serve as an illustration, this strain was taken by the lateral housing extension 19 which is clamped to the bracket 40 secured to the frame. The twisting force on the housing extension was very great because of the small radius at which the resistance to the turning force came into play. This necessitated the use of an expensive malleable iron housing in order to provide the requisite strength. While a portion of the turning force was resisted by the bracket which secured the steering column to the dash it is undesirable to have such stresses transmitted to this point because of the resultant cramping of the steering gear mechanism. In my improved construction I have made use of the simple cast iron cylindrical housing member 12 previously referred to, which is provided with the upper cap member 24 connecting it to the steering shaft housing 26 in the usual manner and with the lower cap member 28 through which the lower end of the steering shaft and associated controls project. I have provided a separate member to take the torque, this torque member having connection with the frame and with the housing. In the forms shown in Figures 1 to 3 the torque member 30 is shown combined with the universal mounting for the steering column which will be later described and is adjustably connected with the housing member 12 through a pin-and-slot connection shown at 32.

In the forms shown in Figures 4 and 5 a simpler form of torque member is provided. In this form also the universal connection is omitted. Here the torque receiving member comprises an L-shaped stamping 34 having one arm secured to the side frame member and the other arm extended upwardly and having adjustable connection with the housing member 12 as shown at 36. The member 34 is preferably secured to the side frame member by the same rivets 38 which assist in securing the bracket 40 to the frame, this bracket serving to support the steering column as previously described.

As previously pointed out in order that the steering column may be properly alined with the dash bracket so that no straining of the parts may be required in assembly, I have preferably mounted the lower end of the column in a manner permitting universal adjustment. Thus the reference character 40, Figure 3, indicates a bracket secured to the side frame member 2 and having a spherical-shaped socket 42 for receiving a ball-shaped portion 44 formed on the extension of the housing 12 in which the shaft 16 is journaled. The socket 42 constitutes a half bearing with which cooperates a socket 43 formed on the lower end of the torque member 30, these parts being secured together by clamping bolts 46. By loosening these bolts the steering column may be adjusted to any position which may be necessary to secure its alinement with the dash carried bracket. When the proper adjustment has been made the steering column is firmly clamped in position by means of these bolts and at the same time the connection between the torque arm 30 and the casing 12 is made secure so that the strains received by the housing are transmitted to the frame.

Again referring to Figures 6 to 9, it will be noted that the steering shaft 4 is provided with a combined radial and thrust bearing 50 within the cap member 24 and with a radial bearing 52 within the cap member 28. The shaft 4 is thus securely held in position. To permit the half nuts to adjust themselves to the shaft so as to prevent binding of the parts in case of any slight inaccuracies in manufacture, I have designed the guideways 10 in which the half nuts 8 reciprocate with a slight clearance 56 at the sides of the nuts thus permitting them slight lateral play. In order to permit the half nuts to accommodate themselves to the rollers 14, in any of their positions of lateral adjustment, I have formed the rollers with spherical bearing surfaces as shown at 58.

To obviate the use of separate bearing pieces of hard metal upon the lower ends of the half nuts where they contact with the rollers, I have resorted to chilling the lower portions of the half nuts as shown at 60 providing an equally effective wear resisting surface at much less cost.

It will be noted that the steering shaft 4 is of the usual hollow construction having a plurality of nested shafts therein, one of which carries at its lower end a gear segment 62 meshing with a segment 64 upon a shaft 66 for operating any of the usual motor controls, while another carries the segment 68 meshing with segment 69 carried by shaft 70 nested within the shaft 66. The innermost of the nested shafts is indicated at 72 and to it may be connected any auxiliary mechanism as, for example, a dimmer switch.

In the modification shown in Figure 9, I have disclosed a slightly different form of combined radial and thrust bearing as at 75 and have also disclosed a construction in which but a single shaft 77 is nested within the steering shaft. This shaft is also shown provided with a frictional holding device shown at 79 of the type disclosed and claimed in my prior application, previously referred to.

I claim:

1. The combination of a vehicle frame, steering gear, a housing for said steering gear including a laterally projecting arm, and a bracket on the frame having a universally adjustable connection with said arm for supporting the steering gear on the frame.

2. The combination of a vehicle frame, a steering shaft, a housing for said shaft, a transverse shaft operated from the steering shaft, a housing for said transverse shaft, and a bracket on the frame having a universally adjustable connection with said last named housing for supporting the steering gear on the frame.

3. The structure as defined by claim 2, and an arm secured to the frame and having an adjustable connection with said first named housing for resisting the tendency of the assembly to rotate about the transverse shaft as a result of the reaction of the road wheels.

4. The combination of a vehicle frame, a steering shaft, a housing for said shaft, a transverse shaft operated from the steering shaft, a housing for said transverse shaft having a spherical portion, a bracket secured to the frame member having a seat to receive said spherical portion of the housing and a cap having a socket therein to receive said spherical portion, said cap being adapted to be clamped to said bracket for adjustably holding the steering gear in position.

5. The structure as defined by claim 4, and an arm projecting from said cap and adapted to be adjustably secured to the housing for resisting the tendency of the assembly to rotate about the transverse shaft.

6. The combination of a steering shaft having its lower end threaded, a housing for said shaft, bearings in the housing for holding the shaft in position, a member having threads for engagement with the threads on the shaft, means for guiding said member for rectilinear movement in the housing, said guiding means being arranged to permit slight lateral movement of the member so that it may adjust itself to the threads on the shaft, and means operated by said member for effecting steering.

7. The combination of a steering shaft provided with right and left hand threads, a housing for said shaft, bearings in the housing for centering the shaft with respect to the housing, half nuts for engagement with the threads on the steering shaft, means for guiding said half nuts for movement longitudinally of the housing, said guiding means being adapted to permit slight lateral movement of the said half nuts so that they may adjust themselves to the threads on the shaft, and means operated by said half nuts for effecting steering.

8. The structure as defined by claim 7, said last named means comprising a rock shaft having rollers for engagement with said half nuts, said rollers having spherical faces.

In testimony whereof I affix my signature.

HARRY M. DENYES.